US008494888B2

(12) United States Patent
Koronthaly et al.

(10) Patent No.: US 8,494,888 B2
(45) Date of Patent: Jul. 23, 2013

(54) OFFLINE MODIFICATION OF BUSINESS DATA

(75) Inventors: David Koronthaly, Sammamish, WA (US); Rolando Jimenez-Salgado, Redmond, WA (US); Sundaravadivelan Paranthaman, Sammamish, WA (US); Arshish Cyrus Kapadia, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 438 days.

(21) Appl. No.: 12/819,237

(22) Filed: Jun. 21, 2010

(65) Prior Publication Data

US 2011/0314085 A1    Dec. 22, 2011

(51) Int. Cl.
*G06F 10/00* (2006.01)

(52) U.S. Cl.
USPC ........................................................ 705/7.11

(58) Field of Classification Search
USPC ........................................................ 705/7.11
See application file for complete search history.

(56) References Cited

U.S. PATENT DOCUMENTS

| 7,689,582 B2* | 3/2010 | Behnen et al. ......... 707/999.102 |
| 8,037,110 B2* | 10/2011 | Salgado et al. ................ 707/804 |
| 2008/0208806 A1 | 8/2008 | Dalfo et al. |
| 2008/0222630 A1 | 9/2008 | Taylor et al. |
| 2008/0270547 A1 | 10/2008 | Glickstien et al. |
| 2009/0037523 A1 | 2/2009 | Kolke et al. |
| 2009/0171679 A1 | 7/2009 | Salgado et al. |

OTHER PUBLICATIONS

Evans, Kirk., "Using Business Connectivity Services in SharePoint 2010", Retrieved at << http://msdn.microsoft.com/en-us/magazine/ee819133.aspx >>, Retrieved Date: Apr. 1, 2010, pp. 27.
Lionelro., "Working with Complex Data Types in Business Connectivity Services", Retrieved at << http://blogs.msdn.com/bcs/archive/2010/02/10/working-with-complex-data-types-in-business-connectivity-services.aspx >>, Feb. 10, 2010, pp. 10.
Choksi, Dipal., "What is Business Connectivity Services—A Beginner View", Retrieved at << http://www.c-sharpcorner.com/UploadFile/DipalChoksi/627/Default.aspx >>, Mar. 12, 2010, pp. 2.
Richards, Jeff., "Integration with External Systems and the Synchronization of Application Data", Retrieved at << https://community.sagecrm.com/partner_community/b/hints_tips_and_tricks/archive/2008/03/30/integration-with-external-systems-and-the-synchronization-of-application-data.aspx >>, Mar. 30, 2008, pp. 14.
"Business Productivity at Its Best", Retrieved at << http://www.google.co.in/url?sa=t&source=web&ct=res&cd=1&ved=0CBUQFjAA&url=http%3A%2F%2Fdownload.microsoft.com%2Fdownload%2FC%2F7%2F4%2FC747C114-8349-48F5-81FC-0F97F3FEF1B8%2FBusinessProductivityatItsBestWhitePaper.pdf& ei=uiu0S97ULI3w0wTC7Mkk& usg=AFQjCNFt5fxGcu35u2epCHqMBh3hNYBXBg& sig2=1Nto1hhbaaJ8YdJCGK_7NA Date: Oct. 2009 >>, White Paper, Oct. 2009, pp. 1-41.

* cited by examiner

*Primary Examiner* — Romain Jeanty
(74) *Attorney, Agent, or Firm* — Hope Baldauff, LLC (57) ABSTRACT

Concepts and technologies for offline modification of business data are disclosed. A client device caches a cached version of business data. A business connectivity services ("BCS") application executing on the client device reviews modifications made to the cached version of the business data and generates one or more operations corresponding to the modifications. The BCS application maintains a queue of operations. The BCS application reviews the operations in the queue and combines or removes operations that can be combined or removed without affecting the dependencies between related operations. The client device accesses a business data server that hosts the business data, and transmits the operations to the business data server in the determined order.

14 Claims, 4 Drawing Sheets

OFFLINE MODIFICATION OF BUSINESS DATA

BACKGROUND

Business connectivity services ("BCS") generally refer to services directed to granting users the ability to obtain read/write access to data from a server that hosts business data such as a line-of-business ("LOB") server, a web server, and the like ("business data server"). Applications providing these services can allow users to access business data stored external to the application used to access the data via custom applications, web services, and the like, to allow users to modify the data, and later synchronize the data with the business data server.

The synchronization of the business data between a client device application that caches a version of the business data, and a business data server or other host system that actually hosts the services associated with the business data typically requires that the business data server support synchronization operations. Each change made to the cached version of the business data typically requires synchronization with the business data server to ensure that the hosted version of the business data and the cached version of the business data are consistent. Additionally, a custom method of synchronizing the cached version of the data and the hosted version of the data must be supported by the business data server and reflected by functionality incorporated into a custom application for providing the services.

Synchronization operations, as well as the downloading or caching of the business data, can consume valuable networking and computational resources. Additionally, custom applications that support synchronization between a business data server and a client device may need to be changed or updated if changes are made to the hosted data or data structure. As these services become more popular, and the number of users of these services continues to increase, synchronization operations may become a strain on networking and computational resources.

It is with respect to these and other considerations that the disclosure made herein is presented.

SUMMARY

Concepts and technologies are described herein for offline modification of business data. In accordance with the concepts and technologies disclosed herein, a client device accesses a business data server and caches a version of business data hosted by the business data server. Modifications can be made to the cached version of the business data at the client device. A BCS application executed at the client device reviews the modifications made to the cached version of the business data, and generates one or more operations corresponding to the modifications.

The BCS application maintains a queue of operations into which each operation generated at the client device is placed. The BCS application reviews the operations in the queue and combines or removes operations that can be combined or removed without affecting the dependencies between related operations in the queue. The BCS application also modifies the order of the operations in the queue such that the operations are maintained in an order in which the operations should be executed by the business data server to ensure that after the host system executes the operations, the hosted version of the business data and the cached version of the business data will be consistent. Therefore, the order of the operations in the queue is not necessarily identical to the order in which the operations are generated at the client device.

The client device accesses the business data server and transmits the operations to the business data server in the determined proper order as reflected by the order of the operations in the queue. Transmission of the operations in the proper order ensures that the hosted version of the business data is modified such that the cached version of the business data and the hosted version of the business data are consistent. From the perspective of the business data server, the operations are received from a device accessing the business data server and generating the operations during the access. Thus, the business data server is unaware that the operations received at the business data server were generated by a BCS application in response to modifications made to a cached version of the business data and later transmitted to the business data server by the client device. The business data server therefore does not need to be configured to support synchronization operations with the client device.

According to one aspect, a business data server hosts business data. A client device communicates with the business data server to obtain a copy of the business data, or a portion thereof. The client device caches the copy of the business data as cached business data. Communications between the client device and the business data server may be terminated, due to needs or preferences, thus preserving network and computational resources.

According to another aspect, a user modifies the cached version of the business data at the client device. The client device executes a BCS application that reviews the modifications and generates operations for transmission to the business data server. The BCS application also maintains a queue of operations. The BCS application is configured to combine, remove, or modify the operations in the queue in accordance with various rules, settings, or preferences relating to the operations. Redundant and/or unnecessary operations are removed from the queue of operations.

The BCS application also is configured to modify the order of the operations in the queue such that the operations are maintained in an order in which the operations should be executed by the business data server. Execution of the operations in the determined order can ensure that after the business data server executes the operations, the business data and the cached version of the business data will be consistent. Therefore, the order of the operations in the queue is not necessarily identical to the order in which the operations are generated by the BCS application.

According to another aspect, when communications between the client device and the business data server are restored, the operations in the queue of operations are transmitted to the business data server in the determined appropriate order, as reflected by the order of the operations in the queue. After the operations are transmitted to the business data server, the cached business data and the business data hosted at the business data server are substantially similar.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Concepts and technologies are described herein for offline modification of business data. In accordance with the concepts and technologies disclosed herein, a client device accesses a business data server and caches a version of business data hosted by the business data server. Modifications can be made to the cached version of the business data at the client device. A BCS application executed at the client device reviews the modifications made to the cached version of the business data, and generates one or more operations corresponding to the modifications.

The BCS application maintains a queue of operations into which each operation generated at the client device is placed. The BCS application reviews the operations in the queue and combines or removes operations that can be combined or removed without affecting the dependencies between related operations in the queue. The BCS application also modifies the order of the operations in the queue such that the operations are maintained in an order in which the operations should be executed by the business data server to ensure that after the host system executes the operations, the hosted version of the business data and the cached version of the business data will be consistent. Therefore, the order of the operations in the queue is not necessarily identical to the order in which the operations are generated at the client device.

The client device accesses the business data server and transmits the operations to the business data server in the determined proper order as reflected by the order of the operations in the queue. Transmission of the operations in the proper order ensures that the hosted version of the business data is modified such that the cached version of the business data and the hosted version of the business data are consistent. From the perspective of the business data server, the operations are received from a device accessing the business data server and generating the operations during the access. Thus, the business data server is unaware that the operations received at the business data server were generated by a BCS application in response to modifications made to a cached version of the business data and later transmitted to the business data server by the client device. The business data server therefore does not need to be configured to support synchronization operations with the client device.

In some embodiments, a business data server hosts business data. A client device communicates with the business data server to obtain a copy of the business data, or a portion thereof. The client device caches the copy of the business data as cached business data. Communications between the client device and the business data server are terminated, due to needs or preferences, thus preserving network and computational resources.

A user modifies the cached version of the business data at the client device. The client device executes a BCS application that reviews the modifications, generates operations for transmission to the business data server. The BCS application maintains a queue of operations. The BCS application is configured to combine, remove, or modify the operations in the queue in accordance with various rules, settings, or preferences relating to the operations. Redundant and/or unnecessary operations are removed from the queue of operations.

When communications between the client device and the business data server are restored, the operations in the queue of operations are transmitted to the business data server in the appropriate order. After the operations are transmitted to the business data server, the cached business data and the business data hosted at the business data server are substantially similar.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for offline modification of business data will be presented.

Figure 1:
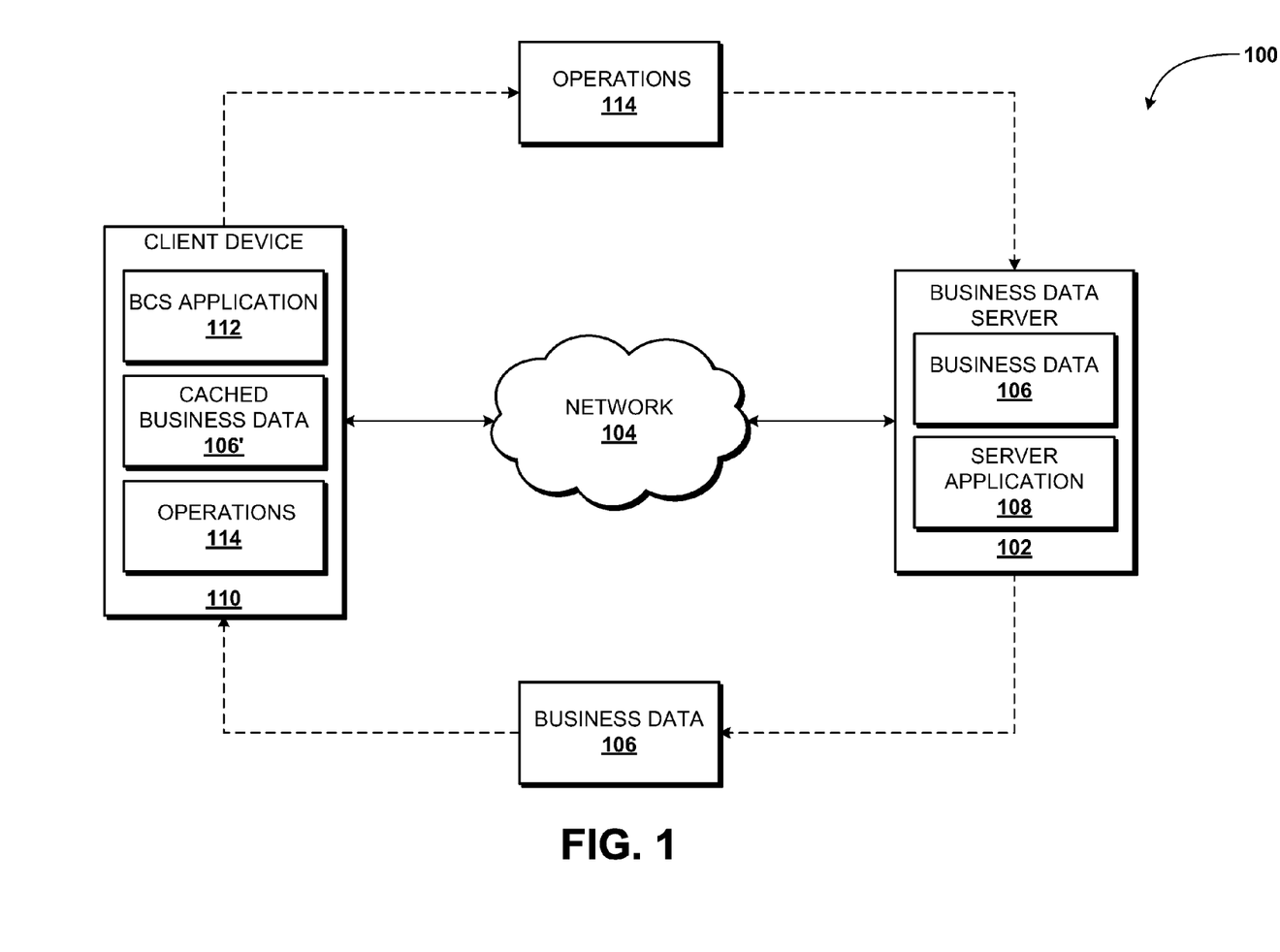
FIG. 1 is a system diagram illustrating an exemplary operating environment for the various embodiments disclosed herein.

Referring now to FIG. 1, aspects of one operating environment 100 for the various embodiments presented herein will be described. The operating environment 100 shown in FIG. 1 includes a business data server 102 operating on or in communication with a network 104. The business data server 102 can be a web server that is accessible via the network 104, and can host data such as the business data 106. The business data 106 can include, but is not limited to, customer information, lists, history, and/or other data; contact lists and/or other information; ordering information, lists, history, and/or other data; invoicing information and/or other data; combinations thereof; and the like. The business data 106 can include almost any kind of data relating to one or more services provided by the business data server 102.

The business data server 102 can be configured to provide a web- or other network-based service for a user or device. Users or devices can connect to the business data server 102 and access the business data 106 and/or perform various operations relating thereto. In some embodiments, the business data server 102 executes a server application 108 configured to allow users or devices to access and/or modify the business data 106 by creating or modifying entities such as customers, accounts, orders, and the like.

The server application 108 can include various applications such as, for example, ordering systems, contact management applications, email and other messaging applications, combinations thereof, and the like. According to various embodiments, the business data server 102 is not configured to support synchronization with other devices, or is configured to synchronize only with certain types of devices, as is explained in more detail herein. In some embodiments, the server application 108 is configured to satisfy read requests and/or queries relating to the business data 106, as well as modify the business data 106 in response to received input.

The operating environment 100 also includes one or more client devices 110 operating on or in communication with the network 104. According to various embodiments, the client device 110 is a personal computer ("PC") such as a desktop, tablet, or laptop computer system. The client device 110 may include other types of computing systems including, but not limited to, server computers, handheld computers, netbook computers, embedded computer systems, personal digital assistants, mobile telephones, smart phones, or other computing devices. The client device 110 is configured to execute an operating system (not illustrated) and one or more client application programs such as, for example, a business connectivity services application 112 ("BCS application"). In various embodiments, the business data server 102 is configured to synchronize with one or more clients, but is not configured to synchronize with the client device 110.

The operating system is a computer program for controlling the operation of the client device 110. The BCS application 112 is an application program configured to execute on top of the operating system to provide the functionality described herein for offlining business data and operations. The BCS application 112 is configured to generate and submit subscriptions to one or more external systems such as, for example, the business data server 102. The subscriptions relate to one or more portions of the business data 106, which can be requested by the BCS application 112.

The BCS application 112 is configured to communicate with the business data server 102 via the network 104 and/or a direct link. The BCS application 112 receives the business data 106, or portions thereof, and caches the business data 106 in a cache, memory, or other data storage location associated with the client device 110. In the illustrated embodiment, the BCS application 112 caches the business data 106 at the client device 110 as the cached business data 106'. While the cached business data 106' is illustrated as being cached at the client device 110, it should be understood that the cached business data 106' can be stored or cached at a data storage device in communication with the client device 110 such as, for example, a database, a server, an external storage device, or another device (not illustrated).

The BCS application 112 also is configured to update or refresh the cached business data 106' at any time during communications with the business data server 102. Additionally, the BCS application 112 is configured to provide a user interface for enabling a user to modify the cached business data 106' when the client device 110 is offline, i.e., when the client device 110 is not actively communicating with the business data server 102. For example, the BCS application 112 may be used to create a new customers, to create new orders for customers, to change customer information, to delete customers, to delete orders and/or other information, as well as other or alternative actions associated with the customers including, but not limited to, creating new orders, modifying orders, cancelling orders, closing accounts, and the like.

According to various embodiments, the BCS application 112 monitors modifications made to the cached business data 106' at the client device 110. The modifications monitored by the BCS application 112 can include any modifications made to the cached business data 106' can be made when the client device 110 is offline, i.e., not actively communicating with the business data server 102. Thus, the BCS application 112 monitors changes made to the cached business data 106' during times at which the client device 110 has little or no network connectivity, and/or during times at which a user associated with the client device 110 wishes to avoid accessing the business data server 102. For example, a user of the client device 110 may wish to limit access to the business data server 102 during particular times due to performance, cost, or other considerations.

The BCS application 112 maintains a queue of operations 114, which can reflect none, some, or all modifications made to the cached business data 106' during any period of time during which the client device 110 is offline, beginning with the reading or downloading of the business data 106 to the client device 110, and ending with the client device 110 communicating modifications made to the cached business data 106' to the business data server 102.

As will be explained in more detail below with reference to FIGS. 2-3, the client device 102 transmits the operations 114 in the queue of operations 114 to the business data server 102 in an order determined by the BSC application 112 to be an appropriate order. The appropriate order for the operations 114 can be determined by the BCS application 112 as or after modifications to the cached business data 106' are made. An exemplary method for ordering operations 114 in the queue of operations 114 is described in detail below with reference to FIG. 3. The BCS application 112 can order and combine or collapse the operations 114, maintain the operations 114 in the appropriate order in a queue, and transmit the operations 114 to the business data server 102 in the appropriate order when connectivity between the client device 110 and the business data server 102 is established. These and other features of the BCS application 112 are described in more detail below with reference to FIGS. 2-4.

According to some embodiments, the business data 106 is stored in one or more data tables. The business data 106 can be organized according to any aspect of the business data 106 including, but not limited to, entity names or other information identifying the entities represented in the business data 106. The cached business data 106' can be stored in one or more data tables that are substantially consistent with the business data 106. The cached business data 106' includes, in some embodiments, one or more columns for storing temporary information, which may or may not be included in the business data 106. For example, if a new customer is created, an internal or temporary customer identification can be assigned to a record for the new customer, and later changes can be associated with this temporary or internal identification.

When the queue of operations 114 are later transmitted to the business data server 102, the operation for creating the new customer can be transmitted first. After the new customer is created at the business data server 102, a permanent customer identifier can be read by the client device 110, and the operations relating to the temporary identification can be updated to reflect the permanent customer identifier. Thus, the subsequent operations 114 can be transmitted to the business data server 102 and applied to the newly created customer.

It should be understood that the above example of ordering the operations 114 relating to creating a parent entity such as a customer (hereinafter referred to as "parent operations") and operations 114 relating to a child or dependent entity such as an order associated with a customer ("hereinafter referred to as "dependent operations") is exemplary, and should not be construed as being limiting in any way. The above example is illustrative of how the operations 114 in the queue of operations 114 can be organized such that the parent operation 114 is transmitted to the business data server 102 before the dependent operations 114 are transmitted to the business data server 102.

FIG. 1 illustrates one business data server 102, one network 104, and one client device 110. It should be understood, however, that some implementations of the operating environment 100 include multiple business data servers 102, multiple networks 104, and multiple client devices 110. Therefore, the illustrated embodiment should be understood as being exemplary, and should not be construed as being limiting in any way.

Figure 2:
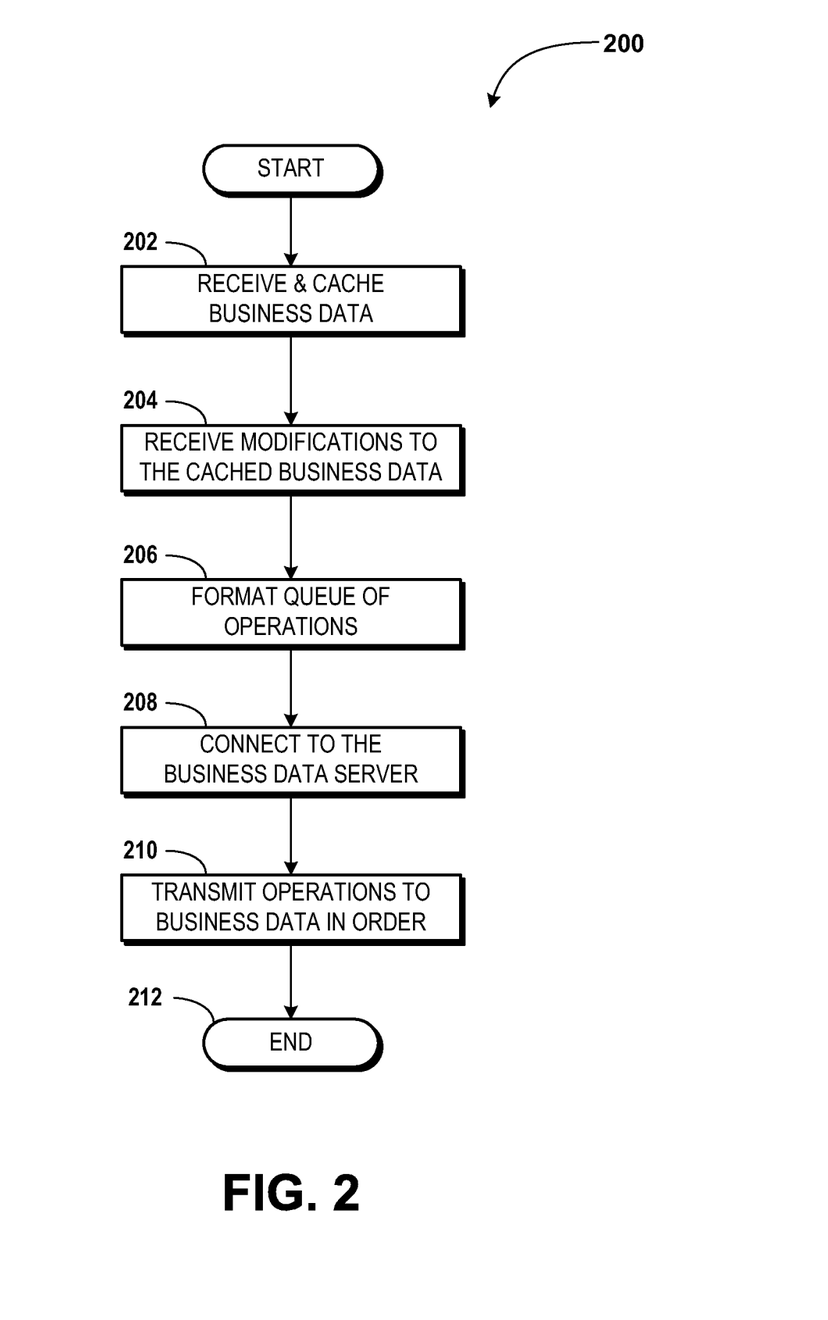
FIG. 2 is a flow diagram showing aspects of a method for offline modification of business data, according to an exemplary embodiment.

Turning now to FIG. 2, aspects of a method 200 for enabling offline access to and modification of business data will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined above. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the client device 110 and/or the BCS application 112. It should be understood that the client device 110 can provide the functionality described herein via execution of one or more applications including, but not limited to, the BCS application 112. Thus, the described embodiments are exemplary, and should not be viewed as being limiting in any way.

The method 200 begins at operation 202, wherein the client device 110 receives business data 106 from the business data server 102. It should be understood that the business data server 102 is not configured to support synchronization operations with the client device 110, though the business data server 102 may be configured in some embodiments to synchronize with other clients, networks, or devices. Thus, the business data server 102 is not aware that the business data 106 is being retrieved by the client device 110 for purposes of maintaining a copy at the client device 110, modifying the cached business data 106' at the client device 110, and/or later transmitting operations reflecting changes made to the cached business data 106' to the business data server 102.

According to some embodiments, the client device 110 reads the business data 106 from the business data server 102 and caches the read data at the client device 110 as the cached business data 106' for use at the client device 110. According to other embodiments, the client device 110 submits one or more queries for the business data 106, and the business data server 102, or the server application 108 executed thereby, satisfies the queries.

Regardless of how the business data 106 is requested or read by the client device 110, it should be understood that from the perspective of the business data server 102, the client device 110 is connected to the business data server 102 to perform online operations on the business data 106 stored at the business data server 102. Because the BCS application 112 can update or refresh the cached business data 106' at any time during communications with the business data server 102, it should be understood that the functionality described in operation 202 can be iterated any number of times. Although not illustrated in FIG. 2, it should be understood that at some time, the client device 110 is offline, i.e., the client device 110 and the business data server 102 are no longer in communication with one another.

From operation 202, the method 200 proceeds to operation 204, wherein the cached business data 106' cached at the client device 110 is modified by a user or other entity while the client device 110 is offline. As mentioned above, the cached business data 106' can include data relating to a customer ordering system. Thus, the modifications received at operation 204 can relate to creation, modification, and/or deletion of customers, orders associated with the customers, contact information associated with the customers, order status information, and the like. The cached business data 106' also can relate to contact information, employee information, invoicing or billing information, as well as other information. These examples are illustrative, and should not be construed as being limiting in any way.

Any number of modifications can be received in operation 204, and these modifications can be received over any period of time. In the above-described example of customer ordering system information, the modifications can include creation of a new customer, as well as creation of additional information associated with that customer such as, for example, contact information, order information, shipping information, and the like. As mentioned above, customers and orders are one example of parent and dependent entities, respectively. Thus, it should be understood that the concepts and technologies disclosed herein can be used with any kind of data. In the above-described example of the customer ordering system information, the cached business data 106' cached at the client device 110 may include order, shipping, contact, or other information for a customer that does not yet exist in the business data 106 stored at the business data sever 102.

Thus, attempts by the client device 110 to transmit operations 114 reflecting changes made to the cached business data 106' to the business data server 102 to update the business data 106 stored at the business data server 102, may result in errors or other complications. For example, a user may have modified the cached business data 106' while offline to add a new entity such as a customer, and to add information relating to the entity such as a new order for the newly-created customer. Similarly, the user may have modified the cached business data 106' to add a new employee and enter hours worked for the employee, to add a new product and to enter an inventory for the new product, to add a new account and to show a deposit or debit from that account, and/or other parent and dependent modifications.

If a dependent operation 114 such as an operation 114 relating to a new order is transmitted to the business data server 102, the business data server 102 may not be able to locate an entity to which the dependent operation 114 relates. In the case of an order for a newly-created customer, the customer associated with the order may not yet exist in the business data 106 stored at the business data server 102. Similarly, if dependent operations 114 such as operations 114 relating to hours worked by an employee, an inventory for the new product, and/or a deposit or debit from an account are transmitted before parent operations 114 such as operations 114 relating to the addition of the new employee, addition of the new product, and/or creation of the new account, the business data server 102 may generate an error or otherwise be unable to complete the operations 114. Thus, to attempt to obviate as many errors or other complications as possible, the client device 110 is configured to maintain a queue of operations 114, as mentioned above, and to transmit the operations 114 to the business data server 102 in an appropriate order to avoid as many errors as possible.

From operation 204, the method 200 proceeds to operation 206, wherein the BCS application 112 formats the queue of the operations 114. As will be described in more detail below with reference to FIG. 3, parent operations 114 relating to creation of parent entities such as new customers, accounts, employees, products, other entities, and the like can be placed earlier in the queue of the operations 114 than dependent operations 114 relating to the parent entities. Thus, the parent entities will exist in the business data 106 when the dependent operations 114 are transmitted to the business data server 102.

Similarly, multiple operations 114 relating to the same entity can be collapsed or combined into one or more operations 114. For example, a first dependent operation 114 may include a dependent action such as an order for three widgets. The dependent operation may relate to a parent entity such as a customer, CustomerA. In other words, the order is associated with a customer who placed the order. Similarly, a second dependent operation 114 may include an order for two widgets that is associated with CustomerA. In this example, the BCS application 112 can combine the first dependent operation 114 and the second dependent operation 114 into one dependent operation 114 that includes an order for five widgets associated with CustomerA. This example is illustrative, and should not be construed as being limiting in any way. The formatting of the queue of operations 114 will be described in more detail below with reference to FIG. 3.

From operation 206, the method 200 proceeds to operation 208, wherein the client device 110 again connects to the business data server 102. From operation 208, the method 200 proceeds to operation 210, wherein the client device 110 transmits the operations 114 to the web server 110 in the order determined in operation 206. In other words, the client device 110 transmits the operations 114 in the queue of operations 114 to the business data server 102 in a determined order. From the perspective of the business data server 102, the client device 110 is connected to the business data server 102, and is modifying the business data 106 in real-time, though the operations 114 received from the client device 112 may reflect modifications made at almost any time. The method 200 ends at operation 212.

Figure 3:
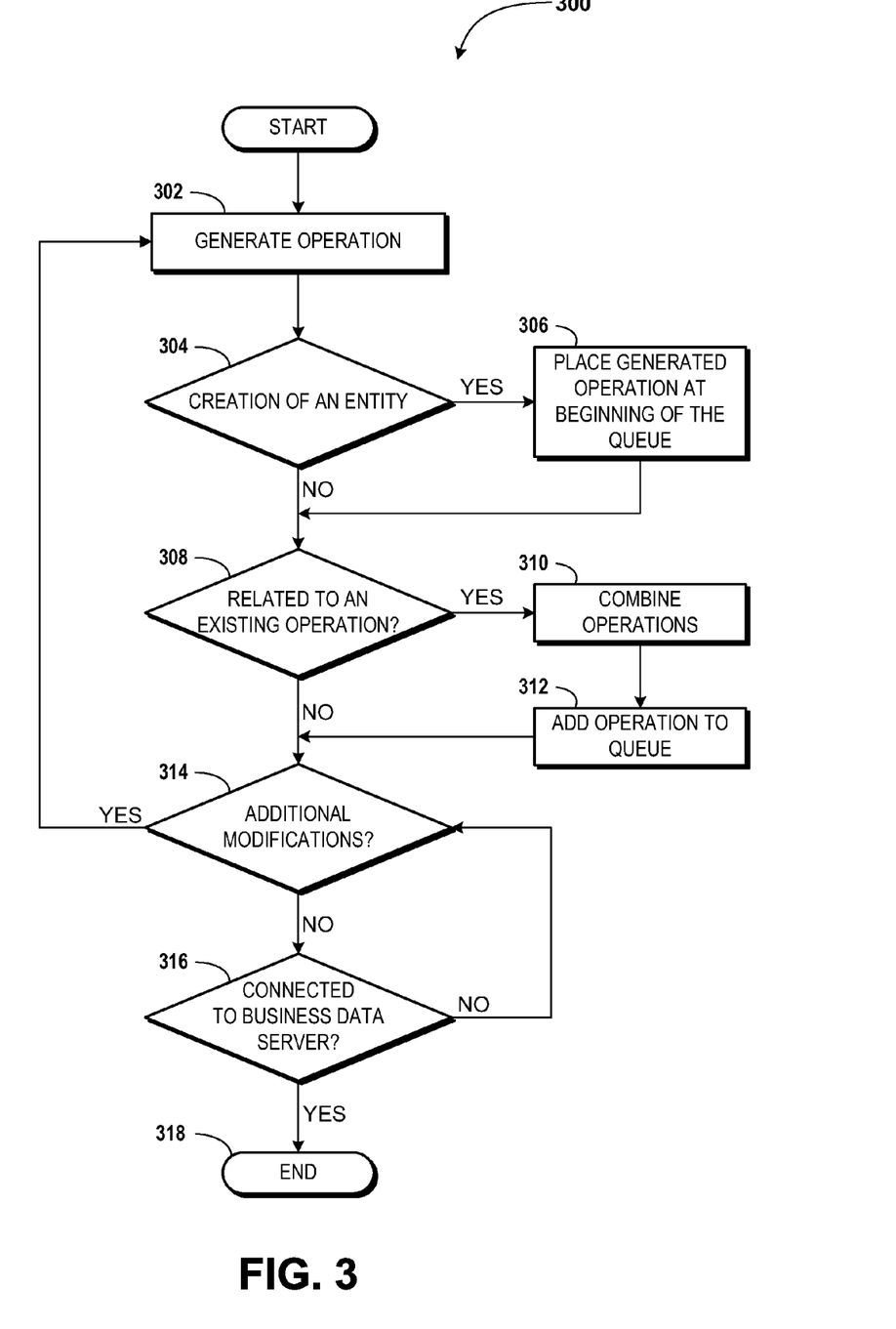
FIG. 3 is a flow diagram showing aspects of a method for formatting a queue of operations, according to an exemplary embodiment.

Turning now to FIG. 3, aspects of a method 300 for formatting the queue of operations 114 at the client device 110 will be described in detail. The method 300 begins at operation 302, wherein the BCS application 112 generates an operation 114 in response to receiving a modification to the cached business data 106'. As mentioned above with respect to operation 204 of FIG. 2, the received modification can include creation, deletion, changing, and/or updating of entities such as customers, employees, products, accounts, and the like, as well as creation, deletion, changing, and/or updating of information associated with the customers, employees, products, accounts, and the like. Thus, the operation 114 generated in operation 302 ("generated operation 114") can include an operation 114 that, when transmitted to the business data server 102 causes the business data server 102 to create, delete, change, and/or update an entity or information associated with the entity.

From operation 302, the method 300 proceeds to operation 304, wherein the BCS application 112 determines if the generated operation 114 is a parent operation 114. As explained above, a parent operation 114 relates to creation of an entity, customer, employee, account, product, and/or other types of parent records. If the generated operation 114 is a parent operation 114, the method 300 proceeds to operation 306, wherein the BCS application 112 places the generated operation 114 at the beginning of the queue of operations 114. For purposes of the specification and claims, it should be understood that the "beginning of the queue of operations 114" refers to first operation 114 that will be transmitted, and is not used to refer to any spatial relationship between the operations 114.

It should be appreciated that multiple parent operations 114 relating to the creation of multiple new entities, customers, employees, accounts, products, or other parent records can be encountered during iterations of the method 300. Each of the parent operations 114 can be placed at the beginning of the queue of operations 114. Thus, the queue of operations 114 can begin with a number of parent operations 114 relating to creating a number of new entities or other parent records.

From operation 306, the method 300 proceeds to operation 308. Similarly, if BCS application 112 determines at operation 304 that the generated operation 114 is not a parent operation 114, the method 300 proceeds to operation 308. In operation 308, the client device 110 determines if the generated operation 114 is related to an existing operation 114, i.e., any operation 114 already existing in the queue of operations 114.

In some embodiments, the cached business data 106' is cached as a data table with a number of tuples or records. The tuples or records can be organized by an entity name associated with the tuples or records. Each operation 114 in the queue of operations 114 may be associated with an entity. Thus, the BCS application 112 can provide the functionality described herein with respect to operation 308 by searching the queue of operations 114 for any existing operation 114 that references the entity referenced by the generated operation 114. If the client device 110 identifies an existing operation 114 in the queue of operations 114 that relates to the entity associated with the generated operation 114, the method 300 proceeds to operation 310, wherein the BCS application 112 combines the generated operation 114 with the existing operation 114. The BCS application 112 can apply a number of rules or preferences when combining operations 114.

In particular, any generated operation 114 or existing operation 114 that already has been transmitted to the business data server 102 cannot be combined with other operations 114 in the queue of operations 114. It will be understood that upon transmission of an operation 114 to the business data server 102, the business data server 102 may modify the business data 106 in response to the transmitted operation 114. Thus, the BCS application 112 assumes that operations 114 transmitted to the business data server 102 have been executed and cannot be combined with other operations 114.

When operation dependencies exist between two or more operations 114, the operations 114 cannot be combined. For example, a parent operation 114 can relate to creation of an entity, and a dependent operation 114 can relate to entering an order associated with the entity. In this example, the parent operation 114 and the dependent operation 114 cannot be combined, as the entity must first be created at the business data server 102 before an order associated with the entity can be created at the business data server 102. Thus, when a dependent operation 114 corresponds to an action relating to an entity associated with a parent operation 114, the dependent operation 114 and the parent operation 114 cannot be combined. Other forms of dependencies are possible, but are not set forth herein for the sake of brevity.

Some parent operations 114 and dependent operations 114 can be combined. For example, a parent operation 114 relating to creation of a new entity, and a dependent operation 114 relating to modifying contact information, updating information associated with the entity, or the like, can be combined. In such cases, the BCS application 112 applies the information reflected in the dependent operation 114 to the information reflected in the parent operation 114, such that the entity is created with the values specified in the dependent operation 114. Similarly, two or more dependent operations 114 can be combined into a single dependent operation 114, wherein the single combined dependent operation 114 reflects the contents of the two or more dependent operations 114.

Delete operations 114 can be collapsed or combined with any type of operations 114. In particular, one or more operations 114 relating to updating entity information and a related delete operation 114 can be replaced by a single delete operation 114. If a parent operation 114 such as an operation 114 for creating an entity is later followed by a delete operation 114 for deleting the entity, the parent operation 114 and the delete operation 114 can be removed form the queue of operations 114, and therefore effectively can be ignored as the entity was created but later deleted without any other changes being made. The above examples of combining operations 114 are exemplary, and should not be construed as being limiting in any way. Generally speaking, the above examples illustrate that multiple operations 114 existing in the queue of operations 114 sometimes can be combined without affecting the end result of the operations 114.

If the BCS application 112 determines that the generated operation 114 is combinable with any existing operation 114, the BCS application 112 combines the operations 114 as appropriate to generate one or more combined operations 114. The one or more combined operations 114 can include one or more operations 114 obtained by combining the generated operation 114 with the existing operations 114, if any exist, as well as operations 114 that could not be combined with other operations 114, if any exist. From operation 310, the method 300 proceeds to operation 312, wherein the combined operations 114 and/or other operations 114 as explained above are put into the queue of operations 114.

If the BCS application 112 determines at operation 308 that the generated operation 114 is not related to an existing operation 114, the method 300 proceeds to operation 314. Similarly, the method 300 proceeds to operation 314 from operation 312. In operation 314, the BCS application 112 determines if an additional modification has been made to the cached business data 106'. If the BCS application 112 determines that an additional modification has been made to the cached business data 106', the method 300 returns to operation 302, wherein the BCS application 112 generates an operation 114 relating to the modification, and determines how to place the generated operation 114 into the queue of operations 114 as described above with reference to operations 302-312. If the BCS application 112 determines that an additional modification has not been made to the cached business data 106', the method 300 proceeds to operation 316.

At operation 316, the BCS application 112 determines if the client device 110 has connected to the business data server 102. If the client device 110 has not connected to the business data server 102, the method 300 returns to operation 314, wherein the BCS application 112 determines if an additional modification to the cached business data 106' has been received, as explained above. If the BCS application 112 determines that the client device 110 has connected to the business data server 102, the method 300 ends, as illustrated at operation 318. Although not illustrated in FIG. 3, it should be understood that the client device 110 transmits the operations 114 to the business data server 102 in the order determined in the method 300, and as reflected by the operations 114 in the queue of operations 114.

Although not described in detail above, the BCS application 112 can be configured to modify the queue of operations 114 based upon some errors and/or conflicts. For example, if a parent operation 114 for creating an entity partially succeeds, the parent operation 114 can be converted into a failed update operation 114, and a permanent identity of the item can be applied to the failed update operation 114, if created by the business data server 102. Thus, during a subsequent transmission of operations 114 in the queue of operations 114, any information relating to a newly-created entity can be transmitted to the business data server 102 as a dependent operation 114 updating the business data 106 with the information originally reflected in the parent operation 114.

Similarly, the BCS application 112 can be configured to modify the queue of operations 114 based upon failure of one or more operations 114. For example, if a delete operation 114 fails during a transmission and an error indicating that the entity targeted by the delete operation 114 does not exist is received, the BCS application 112 can remove the delete operation 114 from the queue of operations 114, if desired. This removal, if desired, can be based upon an assumption that the delete operation 114 succeeded. These and other errors and/or conflicts may be used by the BCS application 112 to modify the queue of operations 114, if desired.

It should be understood that the above-described methods of modifying the queue of operation 114 based upon errors and/or conflicts are optional, and are not necessarily applied in all embodiments. Furthermore, it should be understood that the described methods of modifying the queue of operations 114 based upon errors and/or conflicts are exemplary, and that other methods are possible and are contemplated. Thus, the above embodiments should not be construed as being limiting in any way.

Figure 4:
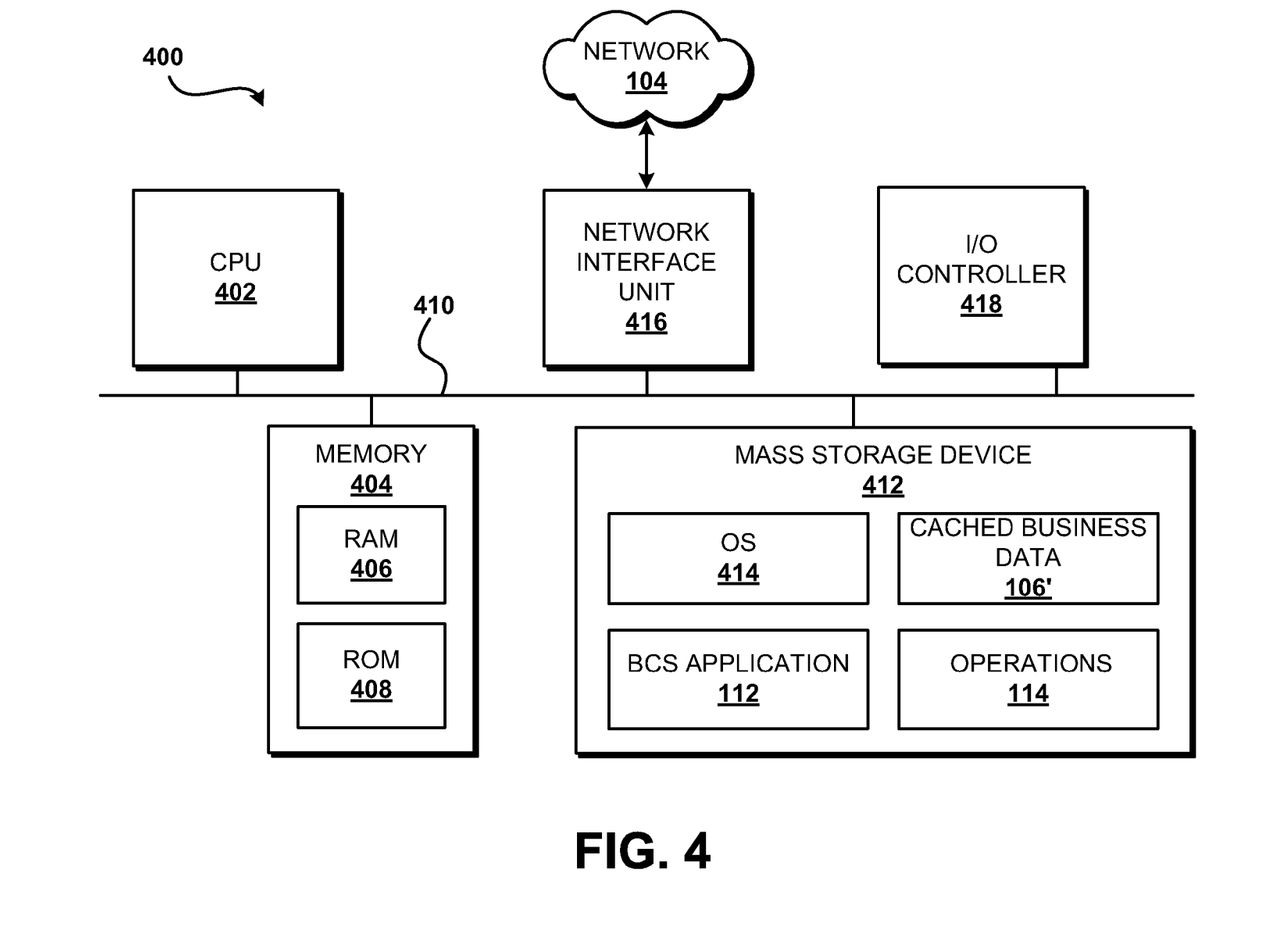
FIG. 4 is a computer architecture diagram illustrating an exemplary computer hardware and software architecture for a computing system capable of implementing aspects of the embodiments presented herein.

FIG. 4 illustrates an exemplary computer architecture 400 for a device capable of executing the software components described herein for offline modification of business data. Thus, the computer architecture 400 illustrated in FIG. 4 illustrates an architecture for a server computer, mobile phone, a PDA, a smart phone, a server computer, a desktop computer, a netbook computer, a tablet computer, and/or a laptop computer. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 414, the cached business data 106', the BCS application 112, and/or the operations 114.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media that can be accessed by the computer architecture 400.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes of this specification and the claims, the phrase "computer-readable storage medium" and variations thereof, does not include waves, signals, and/or other transitory and/or intangible communication media.

According to various embodiments, the computer architecture 400 may operate in a networked environment using logical connections to remote computers through a network such as the network 104. The computer architecture 400 may connect to the network 104 through a network interface unit 416 connected to the bus 410. It should be appreciated that the network interface unit 416 also may be utilized to connect to other types of networks and remote computer systems, for example, the business data server 102. The computer architecture 400 also may include an input/output controller 418 for receiving and processing input from a number of other devices, including a keyboard, mouse, or electronic stylus (not shown in FIG. 4). Similarly, the input/output controller 418 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Based on the foregoing, it should be appreciated that technologies for offline modification of business data have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method comprising performing computer-implemented operations for:
   receiving business data from a business data server;
   caching the business data as cached business data at a data storage location associated with a client device;
   receiving at least one modification relating to the cached business data;
   generating at least one operation corresponding to the at least one modification;
   formatting a queue of operations comprising the at least one operation for communication to the business data server, wherein formatting the queue of operations comprises determining if the at least one operation comprises a parent operation, in response to determining that the at least one operation comprises the parent operation, placing the at least one operation at the beginning of the queue of operations, in response to determining that the at least one operation does not comprise a parent operation, determining if the at least one operation is related to one or more existing operations in the queue of operations, and in response to determining that the at least one operation is related to one or more existing operations in the queue of operations, combining the at least one operation with the one or more existing operations to obtain a combined operation; and
   transmitting the queue of operations to the business data server, wherein the at least one operation comprises a first dependent operation, wherein the one or more existing operations comprises a second dependent operation, and wherein the combined operation comprises a third dependent operation that encompasses modifications corresponding to the first dependent operation and the second dependent operation.

2. The method of claim 1, wherein the queue of operations comprises data that, when received at the business data server causes the business data server to modify the business data stored at the business data server in accordance with the at least one modification received at the client device.

3. The method of claim 1, wherein
   the at least one operation comprises a delete operation,
   combining the at least one operation with the one or more existing operations comprises deleting the one or more existing operations, and
   the combined operation comprises one delete operation.

4. The method of claim 1, further comprising adding the combined operation to the queue of operations.

5. The method of claim 4, further comprising determining if the client device is in communication with the business data server before transmitting the queue of operations to the business data server.

6. The method of claim 1, wherein the business data server does not support synchronization between the business data stored at the business data server and the cached business data cached at the client device.

7. The method of claim 1, wherein
   the at least one operation comprises a dependent operation associated with a parent entity,
   the one or more existing operations comprise a parent operation for creating the parent entity,
   formatting the queue of operations comprises placing the dependent operation associated with the parent entity in the queue of operations and placing the parent operation for creating the parent entity at the beginning of the queue of operations, and
   transmitting the queue of operations comprises transmitting the parent operation before transmitting the dependent operation associated with the parent entity.

8. The method of claim 1, wherein the at least one modification is made to the cached business data when the client device is offline.

9. A computer-implemented method comprising performing computer-implemented operations for:
   receiving business data at a client device, the business data being received from a business data server in communication with the client device;
   caching the business data at a data storage location associated with the client device, the business data being cached as cached business data;
   terminating communications between the client device and the business data server;
   receiving at least one modification relating to the cached business data;
   generating at least one operation corresponding to the at least one modification;
   formatting a queue of operations comprising the at least one operation for communication to the business data server, the queue of operations comprising data that causes the business data server to modify the business data in accordance with the at least one modification received at the client device for modifying the cached business data, wherein formatting the queue of operations comprises determining that the at least one operation comprises a parent operation, and in response to determining that the at least one operation comprises the parent operation, placing the at least one operation at the beginning of the queue of operations;
   determining that communications between the client device and the business data server have resumed; and
   transmitting the queue of operations to the business data server.

10. The method of claim 9, wherein the business data server is not configured to support synchronization between the business data stored at the business data server and the cached business data cached at the client device.

11. The method of claim 9, further comprising:
    in response to determining that the at least one operation does not comprise the parent operation, determining if the at least one operation is related to one or more existing operations in the queue of operations;
    in response to determining that the at least one operation is related to one or more existing operations in the queue of operations, combining the at least one operation with the one or more existing operations to obtain a combined operation; and
    adding the combined operation to the queue of operations.

12. The method of claim 11, wherein
    the at least one operation comprises a dependent operation associated with a parent entity;
    the one or more existing operations comprise a parent operation for creating the parent entity, and
    formatting the queue of operations comprises placing the dependent operation in the queue of operations and placing the parent operation at the beginning of the queue of operations.

13. The method of claim 12, wherein transmitting the queue of operations comprises transmitting the parent operation before transmitting the dependent operation.

14. A non-transitory computer-readable storage medium having computer readable instructions stored thereupon that, when executed by a computer, cause the computer to:
receive business data at a client device, the business data being received from a business data server in communication with the client device;
cache the business data at a data storage location associated with the client device, the business data being cached as cached business data;
terminate communications between the client device and the business data server;
receive at least one modification relating to the cached business data, the modification being made to the cached business data when the client device is offline;
generate at least one operation corresponding to the at least one modification;
format a queue of operations comprising the at least one operation for communication to the business data server, wherein formatting the queue of operations comprises
determining if the at least one operation comprises a parent operation relating to a parent entity,
in response to determining that the at least one operation comprises the parent operation, placing the at least one operation at the beginning of the queue of operations,
in response to determining that the at least one operation does not comprise the parent operation, determining if the at least one operation is related to one or more existing operations in the queue of operations,
in response to determining that the at least one operation is related to one or more existing operations in the queue of operations, combining the at least one operation with the one or more existing operations to obtain a combined operation, and
adding the combined operation to the queue of operations;
determine that communications between the client device and the business data server have resumed; and
transmit the queue of operations to the business data server.

* * * * *

UNITED STATES PATENT AND TRADEMARK OFFICE
CERTIFICATE OF CORRECTION

PATENT NO. : 8,494,888 B2  
APPLICATION NO. : 12/819237  
DATED : July 23, 2013  
INVENTOR(S) : Koronthaly et al.

Page 1 of 1

It is certified that error appears in the above-identified patent and that said Letters Patent is hereby corrected as shown below:

In the Specification,

In column 11, line 49, delete "form" and insert -- from --, therefor.

Signed and Sealed this
Seventeenth Day of February, 2015

Michelle K. Lee
*Deputy Director of the United States Patent and Trademark Office*